US011870167B2

(12) United States Patent
Kishibata

(10) Patent No.: US 11,870,167 B2
(45) Date of Patent: Jan. 9, 2024

(54) BOARD ATTACHED CONNECTOR AND CONNECTOR

(71) Applicant: YAZAKI CORPORATION, Tokyo (JP)

(72) Inventor: Yuya Kishibata, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/689,935

(22) Filed: Mar. 8, 2022

(65) Prior Publication Data

US 2022/0294134 A1 Sep. 15, 2022

(30) Foreign Application Priority Data

Mar. 12, 2021 (JP) ................................ 2021-040600

(51) Int. Cl.
*H01R 12/58* (2011.01)

(52) U.S. Cl.
CPC ................................ *H01R 12/585* (2013.01)

(58) Field of Classification Search
CPC . H01R 12/585; H01R 12/724; H01R 12/7064
See application file for complete search history.

(56) References Cited

U.S. PATENT DOCUMENTS

| | | | | |
|---|---|---|---|---|
| 9,472,876 B1 * | 10/2016 | Hoffmeyer | .......... | H01R 43/205 |
| 2012/0252284 A1 | 10/2012 | Kato | | |
| 2020/0127395 A1 * | 4/2020 | Wright | .................... | H05K 7/02 |
| 2022/0330440 A1 * | 10/2022 | Tsugane | ................ | H01R 12/58 |

FOREIGN PATENT DOCUMENTS

| | | | | |
|---|---|---|---|---|
| JP | H08162187 * | 6/1996 | ......... | H01R 12/7064 |
| JP | 2012-216293 A | 11/2012 | | |

* cited by examiner

*Primary Examiner* — Truc T Nguyen
(74) *Attorney, Agent, or Firm* — KENEALY VAIDYA LLP

(57) ABSTRACT

A board attached connector includes a circuit board including first press-fitting holes and a second press-fitting hole and a connector to be mounted on a mounting surface of the circuit board. The connector includes a plurality of press-fit terminals to be press-fitted into the first press-fitting holes, and a housing holding the plurality of press-fit terminals. The housing includes an extending portion extending along a first direction in which the press-fit terminals are press-fitted into the first press-fitting holes, and provided with a press-fitted portion to be press-fitted into the second press-fitting hole. The board attached connector is configured such that in a temporarily mounted state in which the press-fitted portion is in contact with an edge of the second press-fitting hole, each of tips of the plurality of press-fit terminals in the first direction is located inside the first press-fitting holes without contacting the mounting surface.

4 Claims, 6 Drawing Sheets

BOARD ATTACHED CONNECTOR AND CONNECTOR

CROSS-REFERENCE TO RELATED APPLICATION

The present application claims priority to Japanese Patent Application No. 2021-040600 filed on Mar. 12, 2021, the entire content of which is incorporated herein by reference.

TECHNICAL FIELD

The presently disclosed subject matter relates to a board attached connector and a connector.

BACKGROUND

The related art has proposed connectors provided with terminals that are press-fitted into through holes of a circuit board (hereinafter referred to as "press-fit terminals"), and electrically connected to the circuit board via the press-fit terminals. One of these connectors in the related art includes a plurality of press-fit pins (i.e., press-fit terminals) that are press-fitted into through holes of a circuit board, and a press-fit member (i.e., housing) that holds the plurality of press-fit pins (see, for example, JP2012-216293A).

When the connector provided with the press-fit pins is mounted on the circuit board, the press-fit pins may not properly enter the through holes and may buckle. Specifically, buckling occurs when the press-fit pin that is not in a proper position is pressed in a press-fitting direction in a state of being in contact with the circuit board. To detect the potential buckling of the press-fit pin, the connector in the related art includes a through window provided in the press-fit member with which the buckling of the press-fit pin can be detected through the through window after the press-fit pin is press-fitted into the through hole.

According to the connector in the related art, although the buckling of the press-fit pin can be detected by the above-described configuration, the buckling can be detected only after the connector is mounted on the circuit board. Therefore, according to the connector in the related art, when the buckling of the press fit pin is detected, the circuit board (i.e., substrate product) on which the connector is already mounted will be discarded. In other words, there is room for improvement in the connector in the related art from the viewpoint of productivity of substrate products.

SUMMARY

Illustrative aspects of the presently disclosed subject matter provide a board attached connector and a connector, in which the productivity thereof is improved by detecting the connector that may buckle before the connector is mounted on a circuit board.

According to an illustrative aspect of the presently disclosed subject matter, a board attached connector includes a circuit board including a plurality of first press-fitting holes and a second press-fitting hole and a connector configured to be mounted on a mounting surface of the circuit board. The connector includes a plurality of press-fit terminals configured to be press-fitted into the plurality of first press-fitting holes, and a housing holding the plurality of press-fit terminals. The housing includes an extending portion extending along a first direction in which the plurality of press-fit terminals are press-fitted into the plurality of first press-fitting holes, and provided with a press-fitted portion configured to be press-fitted into the second press-fitting hole. The board attached connector is configured such that in a temporarily mounted state in which the press-fitted portion is in contact with an edge of the second press-fitting hole, each of tips of the plurality of press-fit terminals in the first direction is located inside the plurality of first press-fitting holes without contacting the mounting surface.

According to another illustrative aspect of the presently disclosed subject matter, a connector configured to be mounted on a mounting surface of a circuit board including a plurality of first press-fitting holes and a second press-fitting hole, includes a plurality of press-fit terminals configured to be press-fitted into the plurality of first press-fitting holes and a housing holding the plurality of press-fit terminals. The housing includes an extending portion extending along a first direction in which the plurality of press-fit terminals are press-fitted into the plurality of first press-fitting holes, and provided with a press-fitted portion configured to be press-fitted into the second press-fitting hole. The connector is configured such that in a temporarily mounted state in which the press-fitted portion is in contact with an edge of the second press-fitting hole, each of tips of the plurality of press-fit terminals in the first direction is located inside the plurality of first press-fitting holes without contacting the mounting surface.

Other aspects and advantages of the presently disclosed subject matter will be apparent from the following description, the drawings and the claims.

BRIEF DESCRIPTION OF DRAWINGS

FIGS. 4A and 4B are diagrams illustrating a process of mounting the connector on a circuit board in which FIG. 4A is a cross-sectional view taken along a line A-A of FIG. 1 showing a temporarily mounted state of the board attached connector; and FIG. 4B is a cross-sectional view taken along the line A-A of FIG. 1 showing a mounted state of the board attached connector;

DESCRIPTION OF EMBODIMENTS

Figure 1:
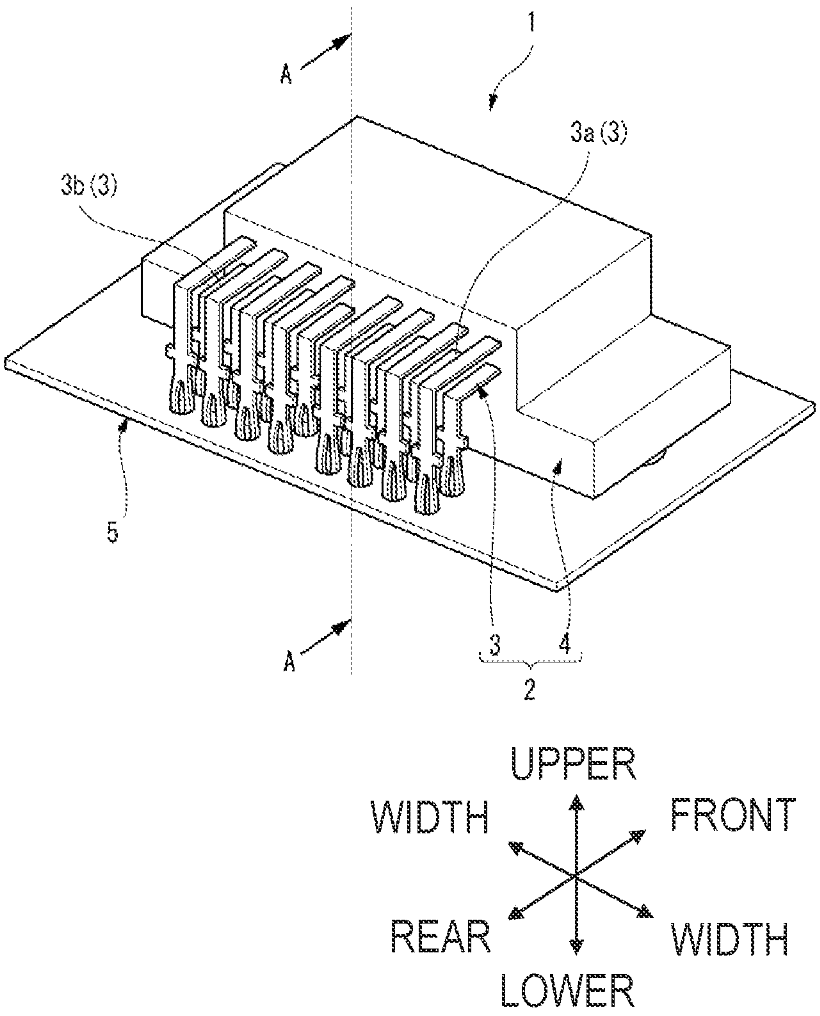
FIG. 1 is a perspective view of a board attached connector according to an embodiment of the presently disclosed subject matter.

Hereinafter, a board attached connector 1 and a connector 2 according to an embodiment of the presently disclosed subject matter will be described with reference to the drawings. FIG. 1 shows the board attached connector 1, which corresponds to the connector 2 in a state of being mounted on a circuit board 5. In the present embodiment, a first press-fitting hole is referred to as a "through hole 51", and a second press-fitting hole is referred to as a "fixing hole 52".

Hereinafter, for convenience of explanation, "front-rear direction", "width direction", "upper-lower direction", "front", "rear". "upper", and "lower" are defined as shown in FIGS. 1 to 5. The "front-rear direction", "width direction", and "upper-lower direction" are orthogonal to each other. A direction from an upper side to a lower side in the upper-lower direction corresponds to a "press-fitting direction (first direction)" in which press-fit terminals 3 are press-fitted into the through holes 51. The width direction corresponds to a "direction orthogonal to the press-fitting direction (second direction)" of the board attached connector 1.

Figure 2:
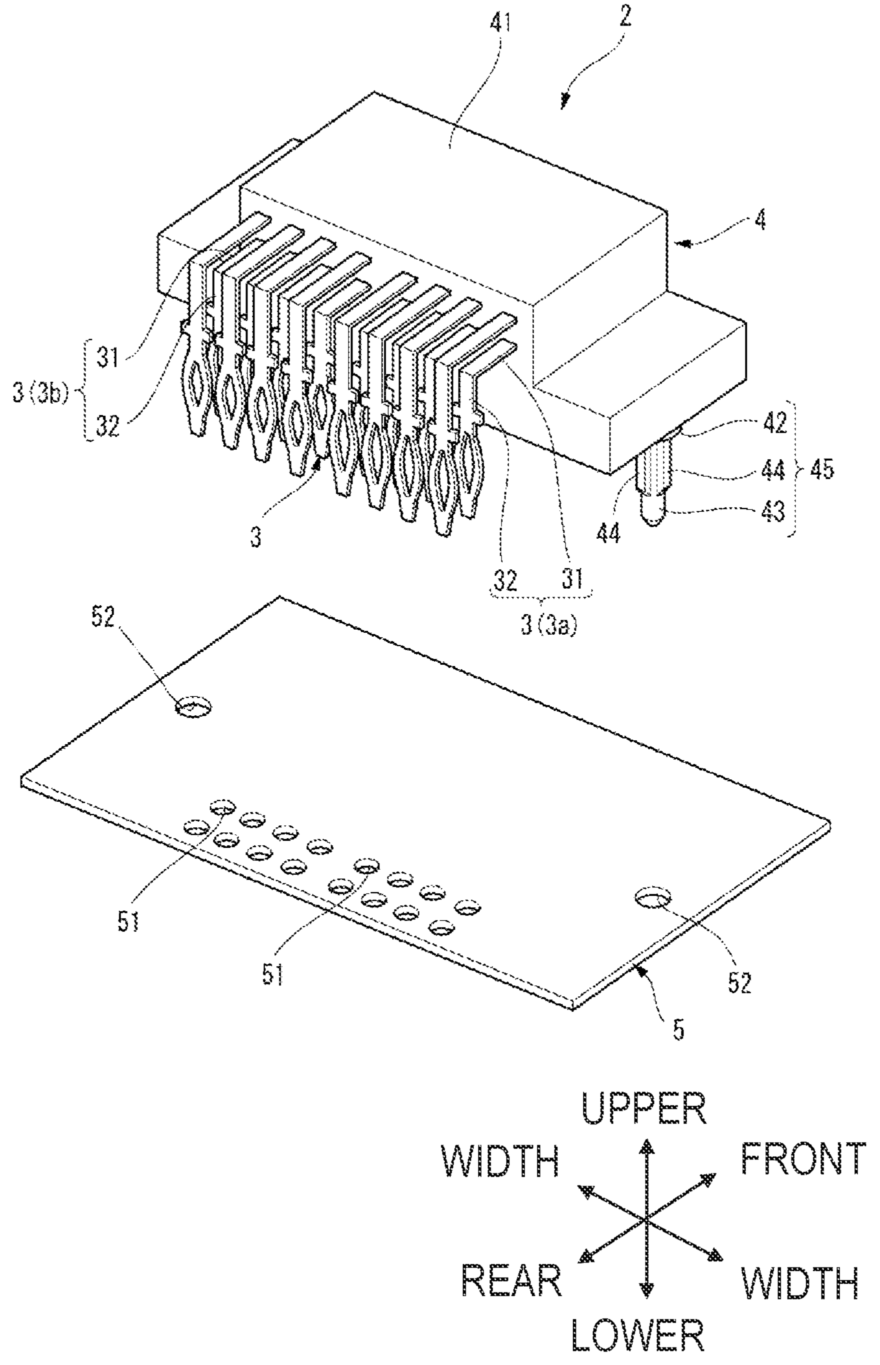
FIG. 2 is an exploded perspective view of the board attached connector shown in FIG. 1.

As shown in FIGS. 1 and 2, the board attached connector 1 includes the connector 2, and the circuit board 5 including a mounting surface on which the connector 2 is to be mounted. The connector 2 includes the plurality of press-fit terminals 3 to be press-fitted into the through holes 51 on the circuit board 5, which will be described later, and a housing 4 that holds the plurality of press-fit terminals 3 such that the plurality of press-fit terminals 3 are arranged along the width direction. In the present embodiment, an upper surface of the circuit board 5 corresponds to the mounting surface.

First, the press-fit terminals 3 will be described. The press-fit terminals 3 are made of a conductive metal material. As shown in FIGS. 1 to 4B, the press-fit terminals 3 include press-fit terminals 3*a* and press-fit terminals 3*b*. The press-fit terminals 3*a* have a different shape of a compliant portion 35, which will be described later, with that of the press-fit terminals 3*b*.

In the present embodiment, the press-fit terminals 3 (16 in total) are arranged in two rows. Each row includes four press-fit terminals 3*a* and four press-fit terminals 3*b* (8 in total) arranged in the width direction. The press-fit terminals 3*a* are held in the housing 4 at predetermined intervals in the width direction. Similarly, the press-fit terminals 3*b* are also held in the housing 4 at predetermined intervals in the width direction.

As shown in FIG. 2, each press-fit terminal 3 includes a first portion 31 extending in the front-rear direction and a second portion 32 extending in the upper-lower direction from a rear end of the first portion 31. In other words, the press-fit terminal 3 substantially has an L shape. The press-fit terminal 3 is held in the housing 4 by, for example press-fitting the first portion 31 into the housing 4, insert-molding the first portion 31 in the housing 4, or the like.

Although not shown, a front end of the first portion 31 functions as, for example, a male terminal, and is to be electrically connected to a female terminal of a mating member which is to be connected to the connector 2.

Figure 3A:
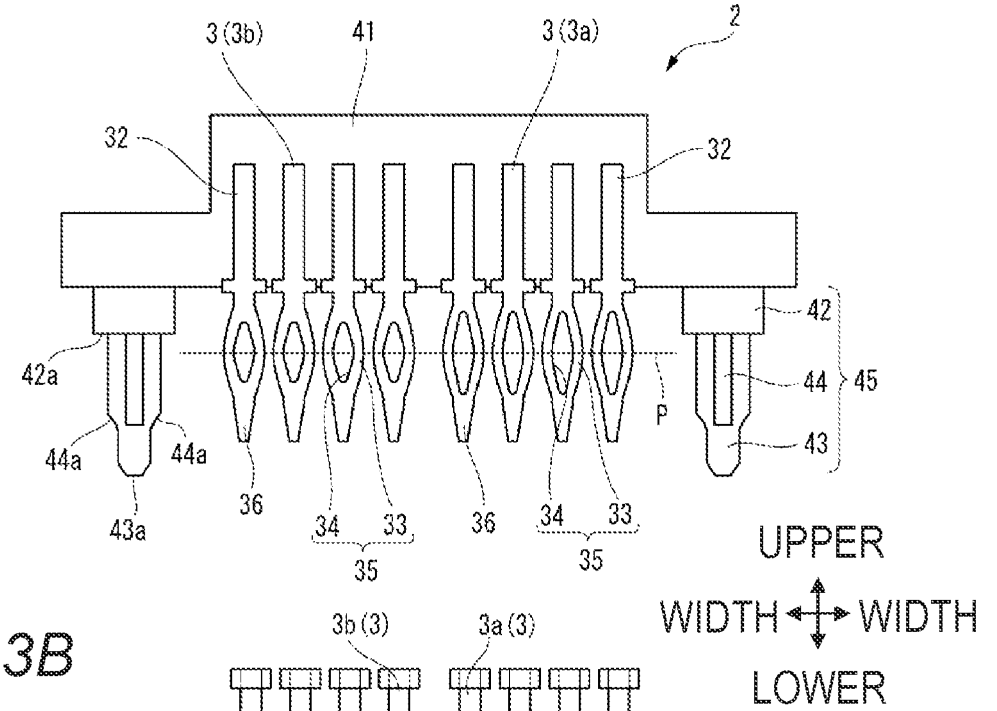
FIG. 3A is a front view of the connector as viewed from a rear side.
Figure 3B:
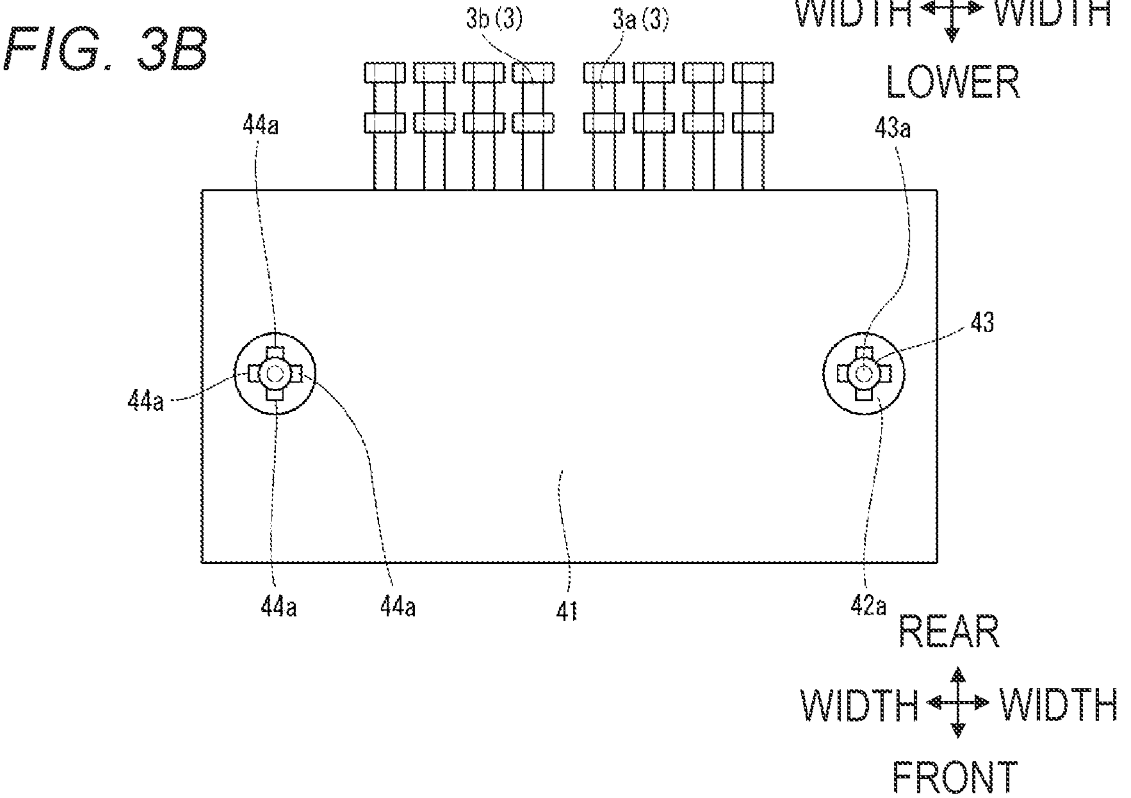
FIG. 3B is a front view of the connector as viewed from a lower side.

As shown in FIGS. 3A and 3B, the second portion 32 includes the compliant portion 35 that bulges towards both sides in the width direction at a predetermined position of the second portion 32 in the upper-lower direction. The compliant portion 35 includes a wide portion 33 having the largest dimension in the width direction, and a hollow portion 34 to be penetrated in the front-rear direction and extending in the upper-lower direction. The compliant portion 35 is elastically deformable in the width direction by including the hollow portion 34.

A tip 36 of the second portion 32 of each of the press-fit terminals 3 is located in the through hole 51 in a temporarily mounted state (see FIG. 4A), which will be described later, and is located at the same height in the upper-lower direction with respect to each other. In other words, the tips 36 of the plurality of press-fit terminals 3 are located on the same plane defined by the front-rear direction and the width direction (that is, a plane extending along the width direction).

The wide portions 33 of the press-fit terminals 3 are located at the same height in the upper-lower direction. In other words, the wide portions 33 of the plurality of press-fit terminals 3 are located on a plane P defined by the front-rear direction and the width direction (see FIG. 3A).

The second portion 32 includes a shoulder portion that protrudes to both sides in the width direction at a position above the compliant portion 35. The press-fit terminal 3 is press-fitted into the through hole 51 by bringing a jig or the like (not shown) into contact with an upper surface of the shoulder portion and pressing the press-fit terminal 3 downward by the jig or the like.

The press-fit terminal 3*a* is different from the press-fit terminal 3*b* in that the compliant portion 35 of the press-fit terminal 3*a* is formed to be larger than that of the press-fit terminal 3*b*. In the present embodiment, the press-fit terminals 3 include press-fit terminals 3*a* and 3*b*, which are of different types, but may also solely include press-fit terminals of the same type.

The types of the press-fit terminals 3 are not limited to the above as long as positions of the wide portions 33 and the tips 36 are configured as described above.

The above is the description of the press-fit terminals 3.

Next, the housing 4 will be described. The housing 4 is made of a resin material. As shown in FIGS. 3A and 3B, the housing 4 includes a body portion 41 holding the press-fit terminals 3 such that the rear end of the first portion 31 and the second portion 32 are exposed rearward, and an extending portion 45 provided on both ends of the body portion 41 in the width direction (2 in total). The extending portion 45 includes a large diameter portion 42, a small diameter portion 43, and press-fitted portions 44.

The large diameter portion 42 has a substantially columnar shape (see FIG. 3B), and projects shortly downward from a lower end surface of the body portion 41. A lower end surface 42*a* of the large diameter portion 42 comes into contact with the upper surface (that is, the mounting surface) of the circuit board 5 in a state where the connector 2 is mounted on the circuit board 5 (see FIG. 4B).

The small diameter portion 43 has a substantially columnar shape (see FIG. 3B), and extends downward from the lower end surface 42*a* of the large diameter portion 42 in the upper-lower direction. As shown in FIG. 3A, the small diameter portion 43 is formed so as to have a smaller diameter than the large diameter portion 42 and to be longer in the upper-lower direction.

The press-fitted portions 44 have a ridge shape that protrudes outward from an outer peripheral surface of the small diameter portion 43 in a circumferential direction and extends from an upper end of the small diameter portion 43 to a predetermined position of the small diameter portion 43 in the upper-lower direction. In the present embodiment, four press-fitted portions 44 are provided on the outer peripheral surface of the small diameter portion 43, and are provided at equal intervals. Specifically, the press-fitted portions 44 are provided at intervals of 90 degrees on the outer peripheral surface of the small diameter portion 43 with a central axis of the small diameter portion 43 as the center. Lower end surfaces 44*a* of the press-fitted portions 44 come into contact with an edge portion (edge) 52*a* of the fixing hole 52 described later in the temporarily mounted state (see FIG. 4A) described later.

In the present embodiment, the housing 4 is provided with two extending portions 45, but the number of the extending portions 45 is not limited to two as long as the connector 2 is self-supporting with respect to the circuit board 5 in the temporarily mounted state as will be described later. Similarly, shape and number of the press-fitted portions 44 are not limited to the above as long as the connector 2 is self-supporting with respect to the circuit board 5 in the temporarily mounted state.

The above is the description of the housing 4.

Next, the circuit board 5 will be described. The circuit board 5 is made of a resin material and has a substantially rectangular flat plate shape. As shown in FIG. 2, the circuit board 5 is formed with through holes 51 into which the press-fit terminals 3 of the connector 2 are to be press-fitted, and fixing holes 52 in which the extending portions 45 of the housing 4 are to be press-fitted.

The through holes 51 are provided on the circuit board 5 corresponding to the press-fit terminals 3. In the present embodiment, the through holes 51 are provided in two rows (16 in total). Each row includes eight through holes 51 provided at predetermined intervals with each other in the width direction. The press-fit terminals 3 are press-fitted into the through holes 51 along the upper-lower direction. In other words, the through holes 51 are open holes running in the upper-lower direction.

The fixing holes 52 are provided on the circuit board 5 corresponding to the extending portions 45. In the present embodiment, the fixing holes 52 are provided far apart from each other in the width direction, and at a position separated from each end portion of the circuit board 5 in the width direction by a predetermined distance (2 positions in total). The extending portions 45 are press-fitted into the fixing holes 52 along the upper-lower direction. In other words, the fixing holes 52 are open holes running in the upper-lower direction.

Figure 5:
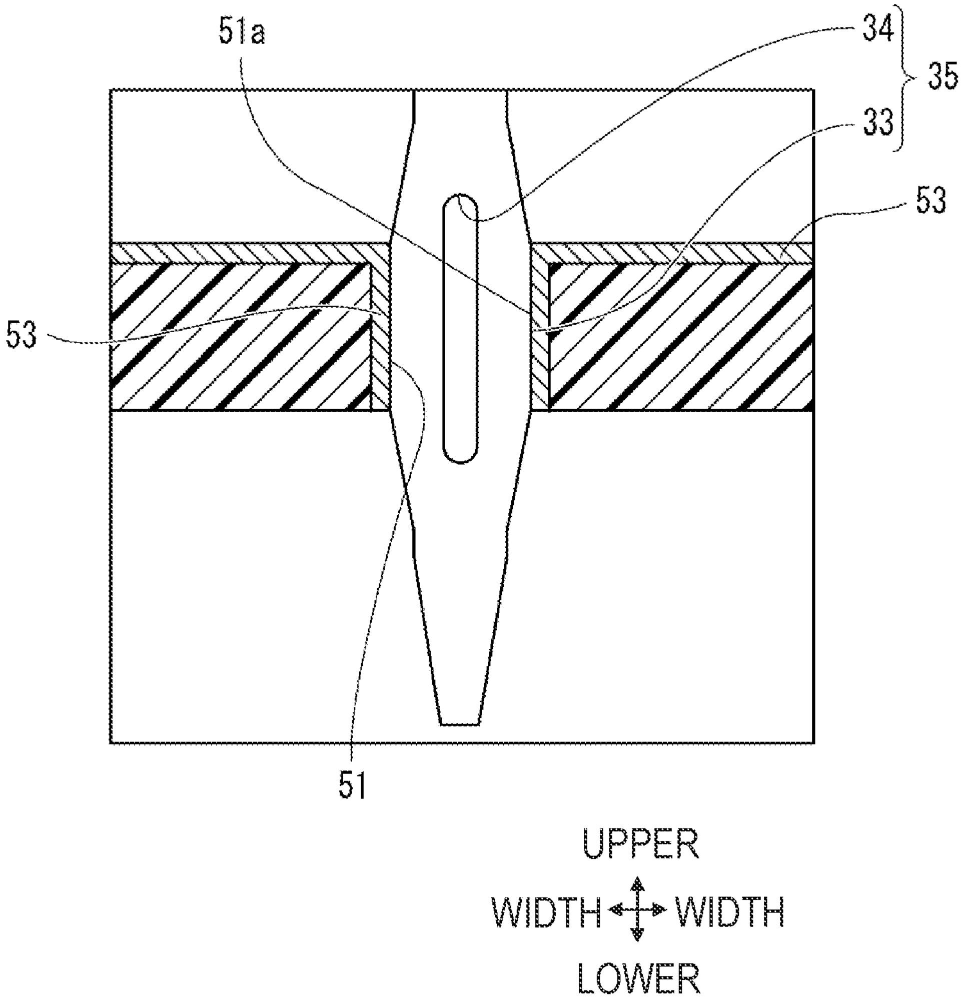
FIG. 5 is an enlarged view of a part B in FIG. 4B.

The circuit board 5 is provided with a conductive circuit body 53 located on a hole inner surface 51*a* of each through hole 51 (in other words, the conductive circuit body 53 covers the hole inner surface 51*a*) (see FIG. 5). The circuit body 53 is electrically connected to a plurality of electronic components mounted on a surface of the circuit board 5 (not shown) or ground points (not shown) via a predetermined circuit pattern (not shown) provided on the surface of the circuit board 5.

From the viewpoint of improving corrosion resistance of the circuit body 53, wettability during soldering, and the like, the circuit body 53 may be covered with, for example, a preflux (organic solderability preservative (OSP)) that functions as a protective film.

The above is the description of the circuit board 5.

Next, a process of mounting the connector 2 on the circuit board 5 will be described. First, the connector 2 and the circuit board 5 are arranged such that the connector 2 is located above the circuit board 5 (see FIG. 2). Specifically, the connector 2 and the circuit board 5 are arranged such that the press-fit terminals 3 are located above the corresponding through holes 51 and the extending portions 45 are located above the corresponding fixing holes 52. Then, when the connector 2 and the circuit board 5 are brought close to each other along the upper-lower direction, lower end surfaces 43*a* of the extending portions 45 (small diameter portions 43) are inserted into the fixing holes 52, and the mounting of the connector 2 on the circuit board 5 is started.

When the connector 2 and the circuit board 5 are brought close to each other in the upper-lower direction, the lower end surfaces 44*a* of the press-fitted portions 44 come into contact with the edge portions 52*a* of the fixing holes 52. The temporarily mounted state is an intermediate stage of the mounting of the connector 2 on the circuit board 5, that is, a state where the lower end surfaces 44*a* and the edge portions 52*a* are in contact with each other as described above (see FIG. 4A). In this case, the connector 2 is self-supporting with respect to the circuit board 5 since the press-fitted portions 44 are provided on the small diameter portion 43 at intervals of 90 degrees.

When the connector 2 (specifically, the housing 4) is not tilted with respect to the circuit board 5, in the temporarily mounted state, the press-fit terminals 3 are not in contact with the mounting surface of the circuit board 5, and the tips 36 are located in the through holes 51. Whether the connector 2 is tilted with respect to the circuit board 5 is identified by, for example, visual inspection or a dedicated machine. In the temporarily mounted state, it is preferable that the tips 36 of the press-fit terminals 3 are located between a central position and a bottom position in a thickness direction of the circuit board 5 inside the through holes 51 in the upper-lower direction.

In this case, if tilt of the connector 2 is not detected, when the connector 2 and the circuit board 5 are brought closer to each other in the upper-lower direction, the extending portions 45 are press-fitted into the fixing holes 52 and the press-fit terminals 3 are press-fitted into the through holes 51. In this case, the compliant portion 35 of each of the press-fit terminals 3 is press-fitted while being elastically deformed inward in the width direction.

Figure 4A:
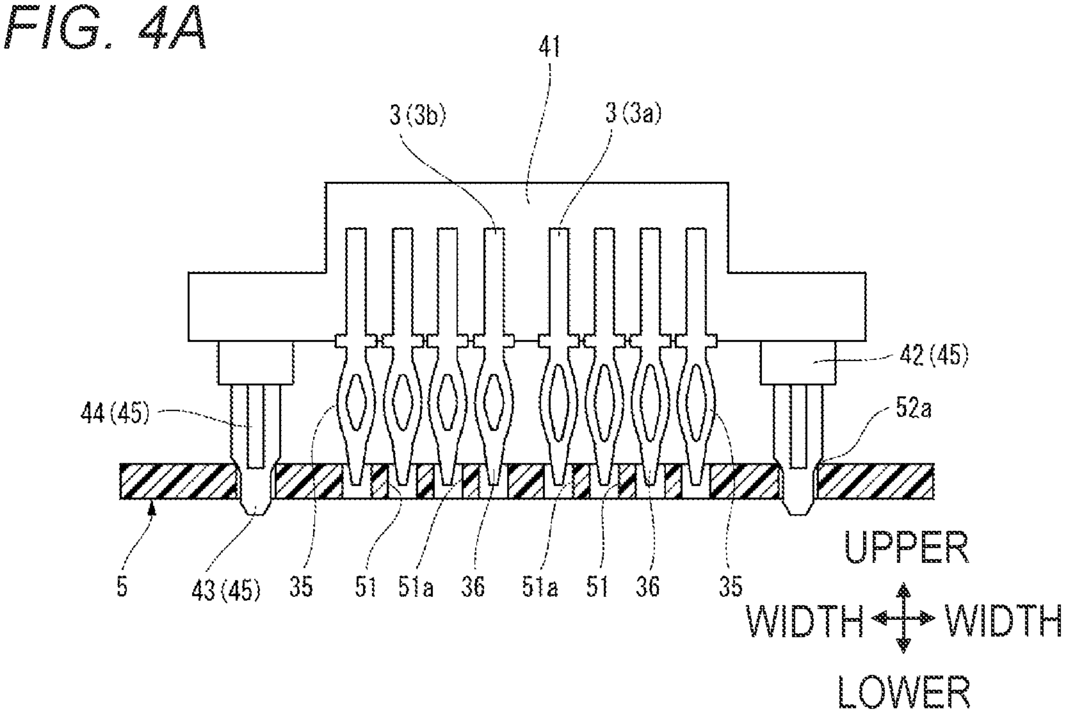
Figure 4B:
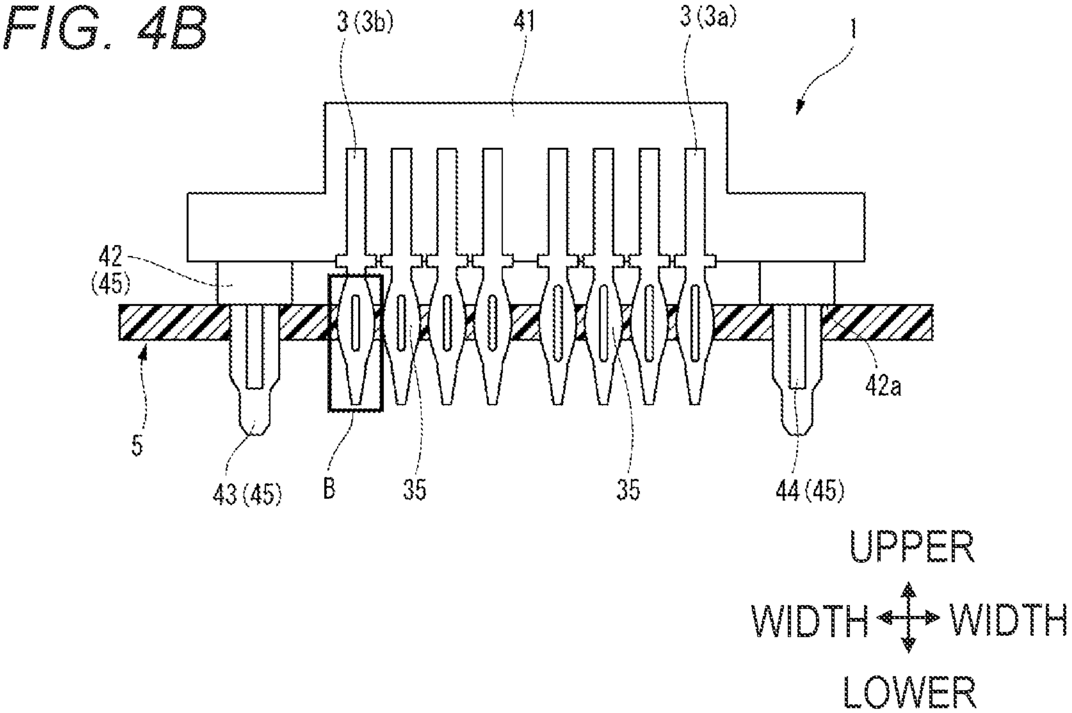

Then, when the lower end surfaces 42*a* of the large diameter portions 42 come into contact with the mounting surface of the circuit board 5, the mounting of the connector 2 on the circuit board 5 is completed (see FIG. 4B). In this case, the compliant portion 35 (particularly, the wide portion 33) of each of the press-fit terminals 3 is in press contact with the hole inner surface 51*a* (specifically, the circuit body 53) of the through hole 51 (see FIGS. 4A, 4B and 5). That is, the connector 2 is mounted on the circuit board 5 as described above to obtain the board attached connector 1.

On the other hand, if the connector 2 is tilted with respect to the circuit board 5, the press-fit terminals 3 are in contact with the mounting surface of the circuit board 5, or the tips 36 are not located inside the through holes 51. In this case, if the tilt of the connector 2 is detected, the connector 2 in the process of mounting is replaced with a new connector 2, and whether the new connector 2 is tilted with respect to the circuit board 5 is inspected again by the above-mentioned process. If the new connector 2 is not detected to be tilted after the replacement, the connector 2 is to be mounted on the circuit board 5 by performing the above-mentioned process that is performed "when the connector 2 is not tilted with respect to the circuit board 5".

As described above, the board attached connector 1 and the connector 2 according to the present embodiment can detect the connector 2 that may buckle by the process of mounting the connector 2 on the circuit board 5. In other words, according to the board attached connector 1 and the connector 2 according to the present embodiment, no buckling inspection process needs to be performed.

The above is the description of the process of mounting the connector 2 on the circuit board 5.

In the board attached connector 1 according to the present embodiment, by confirming a tilted state of the connector 2 with respect to the circuit board 5 before mounting the connector 2 on the circuit board 5, the connector 2 that may buckle can be detected, so that the buckling inspection process can be eliminated. Therefore, according to the board attached connector 1, the circuit board 5 (i.e., substrate product) on which the connector 2 is mounted will not be wasted, and production cost of the substrate product can be reduced.

Further, in the board attached connector 1 according to the present embodiment, before mounting the connector 2 on the circuit board 5, the connector 2 that may buckle can be detected, so that production time of the substrate product can be reduced as compared with connectors in the related art.

Further, in the board attached connector 1 according to the present embodiment, the extending portions 45 are configured so that the housing 4 is self-supporting with respect to the circuit board 5 in the temporarily mounted state (see FIG. 4B). Therefore, in the board attached connector 1, since whether the connector 2 is tilted with respect to the circuit board 5 can be easily and visually identified, accuracy of detecting the connector 2 that may buckle is improved as compared with connectors not configured as described above.

Further, in the board attached connector 1 according to the present embodiment, the tips 36 of the plurality of press-fit terminals 3 are located on the same plane extending along the width direction. Therefore, under the temporarily mounted state, the tips 36 of the plurality of press-fit terminals 3 of the board attached connector 1 are also located on the same plane extending along the width direction even inside the plurality of through holes 51. In other words, in the board attached connector 1, since whether the connector 2 is tilted with respect to the circuit board 5 can be easily identified, the accuracy of detecting the connector 2 that may buckle is improved as compared with the connectors not configured as described above.

As a result, productivity of the board attached connector 1 is improved as compared with the connectors in the related art.

According to the connector 2 according to the present embodiment, similar to the board attached connector 1, the connector 2 that may buckle can be detected by checking the tilted state of the connector 2 with respect to the circuit board 5 in the temporarily mounted state, so that the production cost of the substrate product can be reduced, and the production time of the substrate product can be reduced. Therefore, according to the connector 2, the productivity of the substrate product can be improved compared with the connectors in the related art.

While the presently disclosed subject matter has been described with reference to certain exemplary embodiments thereof, the scope of the presently disclosed subject matter is not limited to the exemplary embodiments described above, and it will be understood by those skilled in the art that various changes and modifications may be made therein without departing from the scope of the presently disclosed subject matter as defined by the appended claims.

Figure 6:
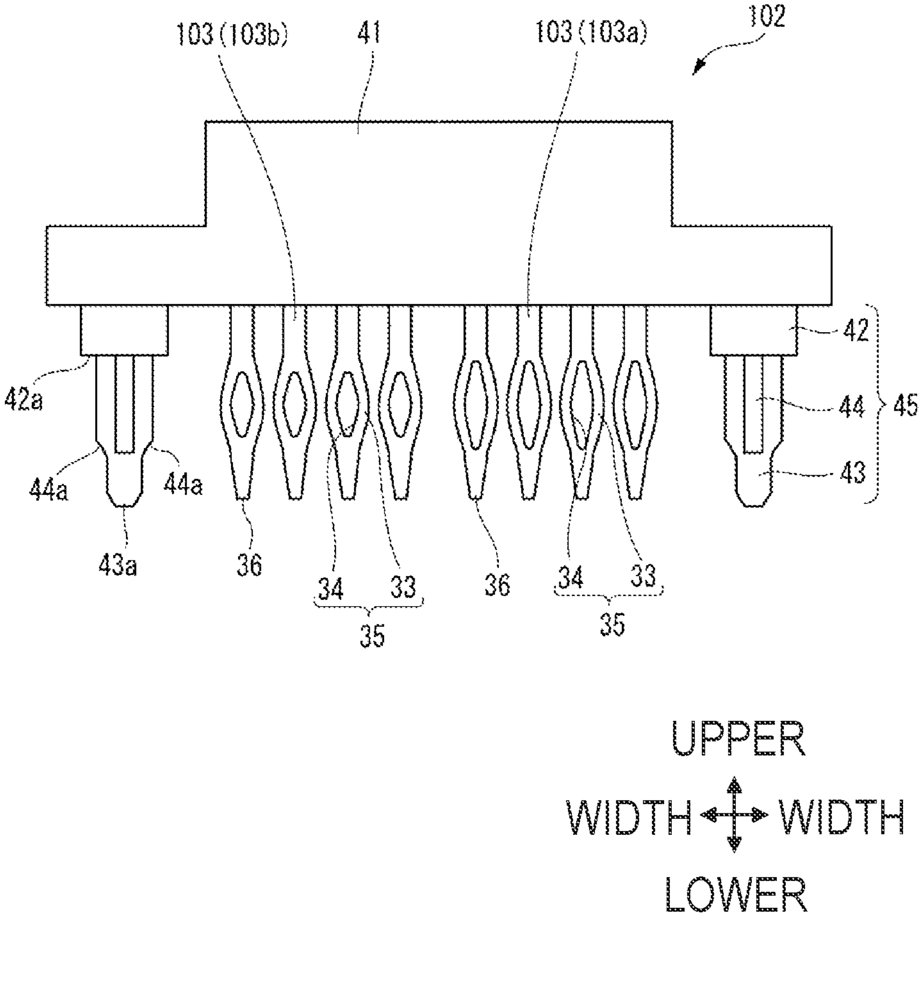
FIG. 6 is a front view of a connector according to another embodiment as viewed from a rear side.

For example, as shown in FIG. 6, a connector 102 may be used, in which press-fit terminals 103 (103*a*, 103*b*) are held on the lower end surface of the body portion 41 so as to extend downward from a lower end surface of the housing 4. A configuration of the press-fit terminals 103 may be the same as or different from that of the press-fit terminals 3. The press-fit terminals 103 are press-fitted into the through holes 51 by bringing a jig or the like (not shown) into contact with an upper end surface of the body portion 41 of the housing 4 and pressing the press-fit terminals 103 downward by the jig or the like.

According to an aspect of the embodiments described above, a board attached connector (1) includes a circuit board (5) including a plurality of first press-fitting holes (for example, through holes 51) and a second press-fitting hole (for example, fixing hole 52) and a connector (2) configured to be mounted on a mounting surface of the circuit board. The connector (2) includes a plurality of press-fit terminals (3) configured to be press-fitted into the plurality of first press-fitting holes, and a housing (4) holding the plurality of press-fit terminals. The housing (4) includes an extending portion (45) extending along a first direction in which the plurality of press-fit terminals (3) are press-fitted into the plurality of first press-fitting holes (for example, through holes 51), and provided with a press-fitted portion (44) configured to be press-fitted into the second press-fitting hole (for example, fixing hole 52). The board attached connector (1) is configured such that in a temporarily mounted state (FIG. 4A) in which the press-fitted portion (44) is in contact with an edge (52*a*) of the second press-fitting hole (for example, fixing hole 52), each of tips (36) of the plurality of press-fit terminals (3) in the first direction is located inside the plurality of first press-fitting holes (for example, through holes 51) without contacting the mounting surface (FIG. 4B).

The board attached connector having the above configuration will be described below. The board attached connector includes the circuit board formed with the first press-fitting holes and the second press-fitting hole, and the connector that includes the press-fit terminals to be press-fitted into the first press-fit holes and the housing that holds the press-fit terminals, and is mounted on the mounting surface of the circuit board. The housing includes the extending portion extending along the press-fitting direction, and the extending portion is provided with the press-fitted portion to be press-fitted into the second press-fitting hole. The board attached connector is configured such that in the temporarily mounted state where the press-fitted portion is in contact with the edge portion of the second press-fitting hole, the tips of the press-fit terminals in the press-fitting direction do not contact the mounting surface and are located inside the first press-fitting holes. In other words, in the temporarily mounted state, if the tips of the press-fit terminals are in contact with the mounting surface or if the tips of the press-fit terminals are not located inside the first press-fitting holes, the connector is tilted with respect to the circuit board.

That is, according to the board attached connector having the present configuration, by confirming a tilted state of the connector with respect to the circuit board before mounting the connector on the circuit board, the connector that may buckle can be detected, so that a buckling inspection process can be eliminated. Therefore, according to the board attached connector having the present configuration, the circuit board (i.e., substrate product) on which the connector is mounted will not be wasted, and production cost of the substrate product can be reduced.

Further, according to the board attached connector having the present configuration, production time of the substrate product can be reduced. Specifically, according to connectors in the related art, for example, an inspection process may be finally performed after mounting an electronic component, a connector, or the like on a circuit board. In such a case, buckling cannot be detected until the inspection process is performed. That is, when the buckling is detected in the inspection process, the substrate product will be discarded, and production time up to that point is wasted. That is, according to the board attached connector having the present configuration, the production time of the substrate product can be reduced as compared with the connectors in the related art since the connector that may buckle can be detected before the connector is mounted on the circuit board.

As a result, productivity of the board attached connector having the present configuration is improved as compared with the connectors in the related art.

The extending portion (45) may be configured such that the housing (4) is self-supporting with respect to the circuit board (5) in the temporarily mounted state (FIG. 4A).

With this configuration, the extending portion is configured such that the housing is self-supporting with respect to the circuit board in the temporarily mounted state. Therefore, in the board attached connector having the present configuration, since whether the connector is tilted with respect to the circuit board can be easily and visually identified, accuracy of detecting the connector that may buckle is improved as compared with connectors not configured as described above.

The tips (36) of the plurality of press-fit terminals (3) may be located on a same plane extending along a second direction perpendicular to the first direction.

With this configuration, since the tips of the plurality of press-fit terminals are located on the same plane extending along the direction orthogonal to the press-fitting direction, it is easy to identify whether the connector is tilted with respect to the circuit board. For example, if positions of the tips of the press-fit terminals are not uniform, when the connector is mounted on the circuit board, some press-fit terminals may enter the first press-fitting holes and others may not. In this case, when the latter press-fit terminals butt against the mounting surface of the circuit board, the former press-fit terminals may become supports that prevent the connector from tilting. In contrast, in the board attached connector having the present configuration, since the positions of the tips of the press-fit terminals are uniform, tilting of the connector is obvious. That is, in the board attached connector having the present configuration, since whether the connector is tilted with respect to the circuit board can be easily and visually identified, the accuracy of detecting the connector that may buckle is improved as compared with the connectors not configured as described above.

According to another aspect of the embodiments described above, a connector (2) configured to be mounted on a mounting surface of a circuit board (5) including a plurality of first press-fitting holes (for example, through holes 51) and a second press-fitting hole (for example, fixing hole 52), includes a plurality of press-fit terminals (3) configured to be press-fitted into the plurality of first press-fitting holes and a housing (4) holding the plurality of press-fit terminals. The housing (4) includes an extending portion (45) extending along a first direction in which the plurality of press-fit terminals (3) are press-fitted into the plurality of first press-fitting holes (for example, through holes 51), and provided with a press-fitted portion (44) configured to be press-fitted into the second press-fitting hole (for example, fixing hole 52). The connector (2) is configured such that in a temporarily mounted state (FIG. 4A) in which the press-fitted portion (44) is in contact with an edge (52*a*) of the second press-fitting hole (for example, fixing hole 52), each of tips (36) of the plurality of press-fit terminals (3) in the first direction is located inside the plurality of first press-fitting holes (for example, through holes 51) without contacting the mounting surface (FIG. 4B).

According to the connector having the above configuration, similarly to the above-described board attached connector, the connector that may buckle can be detected by checking the tilted state of the connector with respect to the circuit board in the temporarily mounted state, so that the production cost of the substrate product can be reduced, and the production time of the substrate product can be reduced. Therefore, according to the connector having the present configuration, the productivity of the substrate product can be improved compared with the connectors in the related art.

What is claimed is:

1. A board attached connector comprising:

a circuit board including a plurality of first press-fitting holes and a second press-fitting hole; and a connector configured to be mounted on a mounting surface of the circuit board, wherein the connector includes a plurality of press-fit terminals configured to be press-fitted into the plurality of first press-fitting holes, and a housing holding the plurality of press-fit terminals, wherein the housing includes a bottom surface and an extending portion extending along a first direction in which the plurality of press-fit terminals are press-fitted into the plurality of first press-fitting holes, and the extending portion is provided with a press-fitted portion configured to be press-fitted into the second press-fitting hole and a first portion that extends away from the bottom surface in the first direction, wherein the board attached connector is configured such that in a temporarily mounted state in which the press-fitted portion is in contact with an edge of the second press-fitting hole, each of tips of the plurality of press-fit terminals in the first direction is located inside the plurality of first press-fitting holes without contacting the mounting surface wherein each of the plurality of press-fit terminals includes a compliant portion that bulges in a direction orthogonal to the first direction, wherein, in a mounted state in which the connector is mounted on the mounting surface of the circuit board, the compliant portion is configured to abut the first press-fitting hole, and wherein the press-fitted portion protrudes from the first portion in a second direction that is orthogonal to the first direction and the press-fitted portion is inside of the second press-fitting hole when the compliant portion abuts the first press-fitting hole.

2. The board attached connector according to claim 1, wherein the extending portion is configured such that the housing is self-supporting with respect to the circuit board in the temporarily mounted state.

3. The board attached connector according to claim 1, wherein the tips of the plurality of press-fit terminals are located on a same plane extending along a second direction perpendicular to the first direction.

4. A connector configured to be mounted on a mounting surface of a circuit board including a plurality of first press-fitting holes and a second press-fitting hole, comprising:

a plurality of press-fit terminals configured to be press-fitted into the plurality of first press-fitting holes; and a housing holding the plurality of press-fit terminals, wherein the housing includes a bottom surface and an extending portion extending along a first direction in which the plurality of press-fit terminals are press-fitted into the plurality of first press-fitting holes, and the extending portion is provided with a press-fitted portion configured to be press-fitted into the second press-fitting hole and a first portion that extends away from the bottom surface in the first direction, wherein the connector is configured such that in a temporarily mounted state in which the press-fitted portion is in contact with an edge of the second press-fitting hole, each of tips of the plurality of press-fit terminals in the first direction is located inside the plurality of first press-fitting holes without contacting the mounting surface wherein each of the plurality of press-fit terminals includes a compliant portion that bulges in a direction orthogonal to the first direction, wherein, in a mounted state in which the connector is mounted on the mounting surface of the circuit board, the compliant portion is configured to abut the first press-fitting hole, and wherein the press-fitted portion protrudes from the first portion in a second direction that is orthogonal to the first direction, and wherein, in the mounted state in which the connector is mounted on the mounting surface of the circuit board and the compliant portion abuts the first press-fitting hole, the press-fitted portion is inside of the second press-fitting hole.

* * * * *